(12) United States Patent
Reed et al.

(10) Patent No.: US 8,922,124 B2
(45) Date of Patent: Dec. 30, 2014

(54) ADJUSTABLE OUTPUT SOLID-STATE LAMP WITH SECURITY FEATURES

(71) Applicant: Express Imaging Systems, LLC, Seattle, WA (US)

(72) Inventors: William G. Reed, Seattle, WA (US); Dale H. DeGraff, Brier, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 0 days.

(21) Appl. No.: 13/679,687

(22) Filed: Nov. 16, 2012

(65) Prior Publication Data

US 2013/0141010 A1    Jun. 6, 2013

Related U.S. Application Data

(60) Provisional application No. 61/561,616, filed on Nov. 18, 2011.

(51) Int. Cl.
*H05B 37/02* (2006.01)
*H05B 33/08* (2006.01)

(52) U.S. Cl.
CPC ............ *H05B 37/02* (2013.01); *H05B 33/0848* (2013.01); *H05B 37/0272* (2013.01)
USPC ........... 315/152; 315/159; 315/308; 315/320; 315/360; 315/294; 362/276

(58) Field of Classification Search
CPC ........... H05B 33/0854; H05B 33/0803; H05B 33/0809; H05B 33/0842; H05B 33/0851; H05B 33/0815; H05B 33/0848; H05B 37/0272; H05B 37/0245; H05B 37/0227
USPC ........... 315/86, 291, 294, 307, 297, 360, 112, 315/132, 292, 293, 308, 152, 159, 320; 362/276

See application file for complete search history.

(56) References Cited

U.S. PATENT DOCUMENTS

| | | | |
|---|---|---|---|
| 4,153,927 A | 5/1979 | Owens | |
| 4,237,377 A | 12/1980 | Sansum | |

(Continued)

FOREIGN PATENT DOCUMENTS

| | | |
|---|---|---|
| DE | 4001980 A1 | 8/1990 |
| EP | 1 734 795 A1 | 12/2006 |

(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

(Continued)

*Primary Examiner* — Thienvu Tran
*Assistant Examiner* — Christopher Lo
(74) *Attorney, Agent, or Firm* — Seed IP Law Group PLLC

(57) ABSTRACT

Disclosed herein is a remotely adjustable lighting system with security features. The lighting system includes a lamp (e.g., luminaire) which carries solid-state light sources and a sensor. The solid-state light sources emit visible light at an adjustable output intensity. The sensor is responsive to line-of-sight wireless signals, and the lamp increases and decreases the output intensity of the light sources in response to output signals of the sensor. The lamp provides security features by selectively accepting and rejecting instructions carried by the line-of-sight wireless signals to vary the output intensity of the light sources.

21 Claims, 3 Drawing Sheets

(56) References Cited

U.S. PATENT DOCUMENTS

| | | |
|---|---|---|
| 5,086,379 A | 2/1992 | Denison et al. |
| 5,160,202 A | 11/1992 | Légaré |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 6,111,739 A | 8/2000 | Wu et al. |
| 6,612,720 B1 | 9/2003 | Beadle |
| 6,753,842 B1 | 6/2004 | Williams et al. |
| 6,828,911 B2 | 12/2004 | Jones et al. |
| 6,841,947 B2 | 1/2005 | Berg-johansen |
| 6,902,292 B2 | 6/2005 | Lai |
| 7,019,276 B2 | 3/2006 | Cloutier et al. |
| 7,066,622 B2 | 6/2006 | Alessio |
| 7,122,976 B1 | 10/2006 | Null et al. |
| 7,188,967 B2 | 3/2007 | Dalton et al. |
| 7,196,477 B2 | 3/2007 | Richmond |
| 7,239,087 B2 | 7/2007 | Ball |
| 7,252,385 B2 | 8/2007 | Engle et al. |
| 7,258,464 B2 | 8/2007 | Morris et al. |
| 7,281,820 B2 | 10/2007 | Bayat et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,578,596 B2 | 8/2009 | Martin |
| 7,578,597 B2 | 8/2009 | Hoover et al. |
| 7,627,372 B2 | 12/2009 | Vaisnys et al. |
| 7,631,324 B2 | 12/2009 | Buonasera et al. |
| 7,633,463 B2 | 12/2009 | Negru |
| 7,677,753 B1 | 3/2010 | Wills |
| 7,688,002 B2 | 3/2010 | Ashdown et al. |
| 7,688,222 B2 | 3/2010 | Peddie et al. |
| 7,703,951 B2 | 4/2010 | Piepgras et al. |
| 7,804,200 B2 | 9/2010 | Flaherty |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,985,005 B2 | 7/2011 | Alexander et al. |
| 8,100,552 B2* | 1/2012 | Spero .................... 362/231 |
| 8,118,456 B2 | 2/2012 | Reed et al. |
| 8,143,769 B2* | 3/2012 | Li ............................ 313/46 |
| 8,174,212 B2 | 5/2012 | Tziony et al. |
| 2002/0113192 A1 | 8/2002 | Antila |
| 2004/0192227 A1 | 9/2004 | Beach et al. |
| 2006/0014118 A1 | 1/2006 | Utama |
| 2006/0066264 A1 | 3/2006 | Ishigaki et al. |
| 2007/0032990 A1 | 2/2007 | Williams et al. |
| 2007/0102033 A1 | 5/2007 | Petrocy |
| 2008/0018261 A1 | 1/2008 | Kastner |
| 2008/0043106 A1 | 2/2008 | Hassapis et al. |
| 2008/0130304 A1 | 6/2008 | Rash et al. |
| 2008/0266839 A1 | 10/2008 | Claypool et al. |
| 2009/0160358 A1 | 6/2009 | Leiderman |
| 2009/0161356 A1* | 6/2009 | Negley et al. ............ 362/231 |
| 2009/0167203 A1 | 7/2009 | Dahlman et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0278479 A1* | 11/2009 | Platner et al. ............ 315/312 |
| 2009/0284155 A1* | 11/2009 | Reed et al. ................ 315/32 |
| 2009/0315485 A1 | 12/2009 | Verfuerth et al. |
| 2010/0052557 A1 | 3/2010 | Van Der Veen et al. |
| 2010/0090577 A1* | 4/2010 | Reed et al. ................. 313/46 |
| 2010/0096460 A1 | 4/2010 | Carlson et al. |
| 2010/0123403 A1 | 5/2010 | Reed |
| 2010/0171442 A1* | 7/2010 | Draper et al. ............. 315/297 |
| 2010/0259193 A1 | 10/2010 | Umezawa et al. |
| 2010/0271802 A1* | 10/2010 | Recker et al. ............. 362/20 |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0221346 A1 | 9/2011 | Lee et al. |
| 2011/0251751 A1 | 10/2011 | Knight |
| 2011/0310605 A1 | 12/2011 | Renn et al. |
| 2012/0001566 A1 | 1/2012 | Josefowicz et al. |
| 2012/0169053 A1 | 7/2012 | Tchoryk, Jr. et al. |
| 2012/0221154 A1 | 8/2012 | Runge |
| 2012/0262069 A1 | 10/2012 | Reed |
| 2013/0049613 A1 | 2/2013 | Reed |
| 2013/0141000 A1 | 6/2013 | Wei et al. |
| 2013/0163243 A1 | 6/2013 | Reed |
| 2013/0340353 A1 | 12/2013 | Whiting et al. |

FOREIGN PATENT DOCUMENTS

| | | | |
|---|---|---|---|
| FR | 2 883 306 A1 | 9/2006 | |
| JP | 6-335241 A | 12/1994 | |
| JP | 2001-333420 A | 11/2001 | |
| JP | 2004-279668 A | 10/2004 | |
| JP | 2004-349065 A | 12/2004 | |
| JP | 2005-93171 A | 4/2005 | |
| JP | 2005-198238 A | 7/2005 | |
| JP | 2005-310997 A | 11/2005 | |
| JP | 2006-179672 A | 7/2006 | |
| JP | 2006-244711 A | 9/2006 | |
| JP | 2008-509538 A | 3/2008 | |
| JP | 2008-130523 A | 6/2008 | |
| JP | 2008-159483 A | 7/2008 | |
| JP | 2008-177144 A | 7/2008 | |
| KR | 2005078403 A | 8/2005 | |
| KR | 10-2006-0086254 A | 7/2006 | |
| KR | 10-2009-0042400 A | 4/2009 | |
| KR | 10-0935736 B1 | 1/2010 | |
| KR | 20-2010-0007230 U | 7/2010 | |
| KR | 10-1001276 B1 | 12/2010 | |
| KR | 10-1044224 B1 | 6/2011 | |
| KR | 10-1150876 B1 | 5/2012 | |
| WO | 02/076068 A1 | 9/2002 | |
| WO | 03/056882 A1 | 7/2003 | |
| WO | 2006/057866 A2 | 6/2006 | |
| WO | 2007/036873 A2 | 4/2007 | |
| WO | 2008/030450 A2 | 3/2008 | |
| WO | 2009/040703 A2 | 4/2009 | |
| WO | 2012/006710 A1 | 1/2012 | |
| WO | 2012/142115 A2 | 10/2012 | |
| WO | 2014/018773 A1 | 1/2014 | |
| WO | 2014/039683 A1 | 3/2014 | |
| WO | 2014/078854 A1 | 5/2014 | |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.

International Search Report, mailed Dec. 13, 2010 for PCT/US2010/035649, 3 pages.

International Search Report, mailed Dec. 15, 2010 for PCT/US2010/035658, 3 pages.

International Search Report, mailed Dec. 28, 2010 for PCT/US2010/035651, 3 pages.

International Search Report, mailed Jul. 9, 2009 for PCT/US2009/043171, 5 pages.

(56) References Cited

OTHER PUBLICATIONS

International Search Report, mailed Jun. 21, 2010 for PCT/US2009/064625, 3 pages.
International Search Report, mailed Oct. 8, 2012 for PCT/US2012/033059, 3 pages.
Littelfuse, "Application Note: Protecting LEDs in Product Designs," 2009, 2 pages.
Panasonic Electronic Components, "LED Lighting Solutions," 2009, 6 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Oct. 8, 2012 for PCT/US2012/033059, 3 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination Using Received Signals," U.S. Appl. No. 13/085,301, filed Apr. 12, 2011, 99 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," U.S. Appl. No. 13/212,074, filed Aug. 17, 2011, 30 pages.
Reed, "Resonant Network for Reduction of Flicker Perception in Solid State Lighting Systems," U.S. Appl. No. 61/527,029, filed Aug. 24, 2011, 41 pages.
Reed et al., "Apparatus and Method for Schedule Based Operation of a Luminaire," U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Change Light Source Color Temperature With Reduced Optical Filtering Losses," U.S. Appl. No. 13/007,080, filed Jan. 14, 2011, 45 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for a Solid-State Light," U.S. Appl. No. 61/229,435, filed Jul. 29, 2009, 29 pages.
Reed et al., "Gas-Discharge Lamp Replacement," U.S. Appl. No. 61/052,924, filed May 13, 2008, 32 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.

Reed et al., "Low-Profile Pathway Illumination System," U.S. Appl. No. 61/051,619, filed May 8, 2008, 25 pages.
Reed et al., "Low-Profile Pathway Illumination System," Amendment dated Jul. 29, 2011 for U.S. Appl. No. 12/437,472, 19 pages.
Reed et al., "Low-Profile Pathway Illumination System," Notice of Allowance dated Oct. 14, 2011 for U.S. Appl. No. 12/437,472, 9 pages.
Reed et al., "Low-Profile Pathway Illumination System," Office Action mailed May 5, 2011 for U.S. Appl. No. 12/437,472, 24 pages.
Reed et al., "Systems and Methods That Employ Object Recognition," U.S. Appl. No. 13/411,321, filed Mar. 2, 2012, 51 pages.
Reed et al., "Turbulent Flow Cooling for Electronic Ballast," U.S. Appl. No. 61/088,651, filed Aug. 13, 2008, 23 pages.
Renn et al., "Solid State Lighting Device and Method Employing Heat Exchanger Thermally Coupled Circuit Board," U.S. Appl. No. 61/357,421, filed Jun. 22, 2010, 49 pages.
International Search Report, mailed Sep. 30, 2011 for PCT/US2011/021359, 3 pages.
Reed, "Electrostatic Discharge Protection for Luminaire," Office Action mailed Mar. 15, 2013 for U.S. Appl. No. 13/212,074, 11 pages.
Written Opinion mailed Sep. 30, 2011 for PCT/US2011/021359, 4 pages.
International Search Report, mailed Feb. 27, 2013 for PCT/US2012/065476, 3 pages.
Written Opinion, mailed Feb. 27, 2013 for PCT/US2012/065476, 8 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report, mailed Jan. 14, 2013 for PCT/US2012/052009, 3 pages.
Kadirvel et al., "Self-Powered, Ambient Light Sensor Using bq25504," Texas Instruments, Application Report, SLUA629—Jan. 2012, 6 pages.
Reed et al., "Adjustable Output Solid-State Lamp With Security Features," U.S. Appl. No. 61/561,616, filed Nov. 18, 2011, 33 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.

(56) References Cited

OTHER PUBLICATIONS

Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination Using Received Signals," Office Action mailed Oct. 1, 2013, for U.S. Appl. No. 13/085,301, 11 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "Luminaire With Ambient Sensing and Autonomous Control Capabilities," U.S. Appl. No. 61/728,150, filed Nov. 19, 2012, 83 pages.
Reed, "Luminaire With Ambient Sensing and Autonomous Control Capabilities," U.S. Appl. No. 13/786,332, filed Mar. 5, 2013, 86 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Atmospheric Electrical Activity Detection and Visual Alert Capabilities," U.S. Appl. No. 13/786,114, filed Mar. 5, 2013, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Solid State Lighting, Drive Circuit and Method of Driving Same," U.S. Appl. No. 13/875,000, filed May 1, 2013, 24 pages.
Written Opinion, mailed Jan. 14, 2013 for PCT/US2012/052009, 5 pages.
International Search Report, mailed Nov. 19, 2013 for PCT/US2013/052092, 4 pages.
International Search Report, mailed Dec. 30, 2013 for PCT/US2013/058266, 3 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Amendment filed Jan. 2, 2014, for U.S. Appl. No. 13/085,301, 26 pages.
Reed, "High Efficiency Power Controller for Luminaire," U.S. Appl. No. 61/905,699, filed Nov. 18, 2013, 5 pages.
Written Opinion, mailed Nov. 19, 2013 for PCT/US2013/052092, 7 pages.
Written Opinion, mailed Dec. 30, 2013 for PCT/US2013/058266, 8 pages.
International Search Report, mailed Feb. 26, 2014, for PCT/US2013/070794, 3 pages.
Poplawski, "Exploring Flicker & LEDs," 2010 DOE SSL Market Introduction Workshop, U.S. Department of Energy, Jul. 22, 2010, 16 pages.
Reed et al., "Apparatus and Method for Schedule Based Operation of a Luminaire," Office Action mailed Mar. 26, 2014, for U.S. Appl. No. 13/604,327, 10 pages.
Reed et al., "Long-Range Motion Detection for Illumination Control," Office Action mailed Jan. 30, 2014, for U.S. Appl. No. 12/784,080, 26 pages.
Reed et al., "Long-Range Motion Detection for Illumination Control," Amendment filed Apr. 28, 2014, for U.S. Appl. No. 12/784,080, 20 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination Using Received Signals," Office Action mailed Apr. 23, 2014, for U.S. Appl. No. 13/085,301, 12 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Written Opinion, mailed Feb. 26, 2014, for PCT/US2013/070794, 10 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Long-Range Motion Detection for Illumination Control," Notice Of Allowance mailed Jun. 20, 2014, for U.S. Appl. No. 12/784,080, 7 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination Using Received Signals," Amendment filed Jul. 23, 2014, for U.S. Appl. No. 13/085,301, 12 pages.
Reed, "Electronic Control to Regulate Power for Solid-State Lighting and Methods Thereof," Amendment filed May 27, 2014, for U.S. Appl. No. 12/619,535, 22 pages.
Reed, "Luminaire With Atmospheric Electrical Activity Detection and Visual Alert Capabilities," Notice Of Allowance mailed Jul. 1, 2014, for U.S. Appl. No. 13/786,114, 9 pages.

* cited by examiner

ADJUSTABLE OUTPUT SOLID-STATE LAMP WITH SECURITY FEATURES

BACKGROUND

1. Technical Field

This disclosure is generally related to solid-state lamps such as luminaires.

2. Description of the Related Art

Lighting designers and installers often need to adjust an output intensity of a lighting device (e.g., luminaire) that has been installed. In particular, it may be desirable to adjust the output intensity of one or a few lighting devices within a track or from an entire floor of lighting without affecting the remaining lighting devices. For example, after the installation of multiple lighting devices at a shopping area, brighter lighting may be desired near stairways, escalators, entrances, or rest rooms, while dimmer lighting may be desired near storefronts, self-illuminated displays, kiosks, or above well-lit seasonal displays, such as above Christmas trees.

Many lighting devices are installed at heights that cause adjustment of lighting devices, e.g., changing light bulbs, to be time-consuming and costly. In many situations, the lighting devices are mounted at heights exceeding the reach of a maintenance person, even while on a ladder. As a result, adjusting the lighting devices requires a "bucket truck" or a self-propelled scissor lift. Use of such equipment requires following safety procedures, such as blocking off the work area and posting an additional worker to stand as a look-out, to protect both the maintenance person and any potential customers in the vicinity of the maintenance. Thus, adjusting lighting devices can be time-consuming and costly.

Several methods have been used to individually adjust the output intensity of lighting devices in lighting installations, but the methods are not practical for providing control over individual lighting devices that are part of an entire track or an entire floor of lighting devices. For incandescent lighting devices, individual electronic wall-mounted dimmer modules may be wired to each lighting device. Such a process may require twice the amount of wiring needed to simply provide power to the lighting device. Thus, in addition to the low efficacy and relatively short operational lifetime of an incandescent lighting device, connecting additional wiring to dim the incandescent lighting device adds hardware and labor costs to the overall lighting installation.

High efficacy lighting devices, such as metal halide lighting devices, typically cannot be dimmed effectively. Metal halide ballasts allow some types of metal halide devices to be dimmed but also require extensive wiring and control systems to enable dimming.

Other approaches to individually adjusting the output intensity of lighting devices include manufacturing incandescent light bulbs with multiple incandescent filaments, or installing neutral density filters within lighting devices. Incandescent light bulbs having multiple incandescent filaments typically require connection to a multiple-position switch in order to select one or more of the filaments within the lighting device. Similar to the approach using a wall-mounted dimmer, connecting additional wiring to support use of a multiple-position switch adds hardware and labor costs to the lighting installation. Additionally, installing filters to adjust the output intensity of the lighting device wastes energy by reducing the efficacy of the lighting device and suffers from the drawbacks associated with having a person physically elevated to the lighting device to adjust the output intensity of the lighting device.

BRIEF SUMMARY

Disclosed herein is a wirelessly adjustable lighting system with security features. The lighting system includes a lamp (e.g., a luminaire) that detachably couples to a light fixture (e.g., receptacle). The lamp or luminaire carries solid-state light sources (e.g., light emitting diodes) and a sensor (e.g., infrared sensor). The solid-state light sources emit visible light at an output intensity that is adjustable. The sensor produces output signals in response to line-of-sight wireless signals, and the lamp increases and decreases the output intensity of the light sources in response to the output signals of the sensor.

The lamp provides security features by selectively accepting and rejecting instructions carried by the line-of-sight wireless signals. The line-of-sight wireless signals may carry security codes as well as instructions to increase, decrease, turn OFF, or turn ON the output intensity of the light sources. The lamp may selectively accept instructions to adjust the output intensity of the light sources based upon the receipt of a correct security code. Additionally, the lamp may reject instructions to adjust the output intensity of the light sources based on a time-out condition, receipt of an invalid instruction, or receipt of a faulty security code.

A lighting system for use with lighting fixtures having at least one coupler configured to provide detachable physical and electrical connections therewith may be summarized as including a lamp (e.g., luminaire), including: a number of solid-state light sources; at least one complementary coupler that physically and electrically detachably couples to the coupler of the lighting fixture; at least one sensor responsive to a number of line-of-sight wireless signals to provide a number of wireless sensor output signals representative of the sensed line-of-sight wireless signals; and a set of driver electronics electrically coupled between the complementary coupler of the lamp and the solid-state light sources of the lamp and which adjusts an amount of light output by the solid-state light sources based at least in part on the line-of-sight wireless signals sensed by the at least one sensor.

The lighting system may further include a remote transmitter having a user interface selectively operable by a user to receive a number of user inputs, the remote transmitter operable to transmit the number of line-of-sight wireless signals in response to the user inputs received via the user interface. The line-of-sight wireless signals may include adjustment instructions indicative of an adjustment in the amount of light output by the solid-state light sources, and the driver electronics may be responsive to the adjustment instructions to vary the amount of light output by the solid-state light sources based on the adjustment instructions. The driver electronics may include a controller that validates an access identifier encoded in the line-of-sight wireless signals before the controller becomes responsive to adjustment instructions encoded in the line-of-sight wireless signals. The lighting system may further include a memory communicatively coupled to the controller, wherein the controller validates the access identifier against data stored in the memory. The memory may be writable and data stored therein may be user-changeable. In response to a validation of the access identifier by the controller, the controller may enter a command mode within which the controller is responsive to a number of additional adjustment instructions to vary the output intensity of the solid-state light sources. In response to the validation of the access identifier the controller may execute a timer and exit the command mode at an expiration of the timer. In response to the validation of the access identifier the controller may execute a timer, reinitiate the timer on receipt of each additional command, and exit the command mode at an expiration of the timer. The driver electronics may include a transformer having a primary and a secondary, the primary electrically coupled to the complementary coupler, and a switch mode power converter electrically coupled to the secondary of the transformer and to the solid-state light sources. The lamp may further include a housing physically coupled to the complementary coupler and that at least partially encloses the driver electronics. The at least one sensor may include a plurality of sensors recessed into the housing. The lamp may further include a lens and the solid-state light sources and the at least one sensor may be positioned relatively behind the lens with respect to a direction in which light is transmitted by the solid-state light sources.

The line-of-sight wireless signals elegantly solves the problem of isolating, identifying or associating control with respective individual lamps or luminaires, particularly where there are two or more closely located lamps or luminaires. For example, such may be particularly suited to control lighting in a warehouse, "box store" retail location (e.g., COSTCO®, SAM's CLUB®), supermarket, parking lot, stadium, theater, or other venue, whether indoor or outdoor location. An operator may easily and conveniently individually adjust operational parameters (e.g., brightness) for each of a plurality or lamps or luminaires, by simply aiming or otherwise orienting a remote control transmitter at selected lamps or luminaires to transmit operational instructions thereto.

A method of manufacturing a lamp for use with lighting fixtures having at least one coupler configured to provide detachable physical and electrical connections therewith may be summarized as including electrically coupling a complementary coupler of the lamp, that physically and electrically detachably couples to the at least one coupler of the lighting fixture, to a number of solid-state light sources; communicatively coupling a set of driver electronics to at least one sensor that is responsive to a number of line-of-sight wireless signals and that provides a number of wireless sensor output signals representative of the sensed line-of-sight wireless signals; and electrically coupling the set of driver electronics between the complementary coupler of the lamp and the solid-state light sources of the lamp to adjust an amount of light output by the solid-state light sources based at least in part on the line-of-sight wireless signals sensed by the at least one sensor.

The method may further include physically coupling a housing to the complementary coupler of the lamp, and mounting the at least one sensor to the housing. The method may further include positioning the at least one sensor and the solid-state light sources relatively behind a lens with respect to a direction in which light is transmitted from the solid-state light sources. The method may further include configuring the set of driver electronics to validate an access identifier encoded in the number of line-of-sight wireless signals; and after the set of driver electronics validates the access identifier, configuring the set of driver electronics to adjust the amount of light output by the solid-state light sources in response to output intensity adjustment instructions encoded in the number of line-of-sight wireless signals. The method may further include communicatively coupling a rewriteable memory to the set of driver electronics and storing a user-changeable master access identifier in the rewriteable memory against which the set of driver electronics validates the encoded access identifier. The method may further include electronically storing a set of adjustment instructions in the lamp that are indicative of output intensity adjustment instructions encodable in the number of line-of-sight wireless signals, and configuring the set of driver electronics to adjust the amount of light output by the solid-state light sources in response to comparing the set of adjustment instructions to the output intensity adjustment instructions encoded in the number of line-of-sight wireless signals.

A method of operating a solid-state lamp for use with lighting fixtures having at least one coupler configured to provide detachable physical and electrical connections therewith may be summarized as including physically and electrically coupling a complementary coupler of the solid-state lamp to the at least one coupler of the fixture to transfer power to the solid-state lamp; receiving a number of wireless line-of-sight signals with a sensor that is electrically coupled to the solid-state lamp and that is carried by the solid-state lamp; and adjusting, with a set of driver electronics that are carried by the lamp, an amount of light output by the solid-state lamp in response to output intensity adjustment commands encoded in the number of wireless line-of-sight signals.

The method may further include entering a command mode in response to validating, with the set of driver electronics, an access identifier embedded in the wireless line-of-sight signals; receiving an additional number of wireless line-of-sight signals; and preventing an adjustment, that is based on the additional number of wireless line-of-sight signals, of the amount of light output by the solid-state lamp while not in the command mode. The method may further include communicatively coupling a memory that is carried by the solid-state lamp to the set of driver electronics; storing a digital potentiometer setting in the memory; determining a resistance between at least two terminals of the digital potentiometer based upon the stored potentiometer setting; and setting the amount of light output by the solid-state lamp based upon the resistance between the at least two terminals of the digital potentiometer.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1:
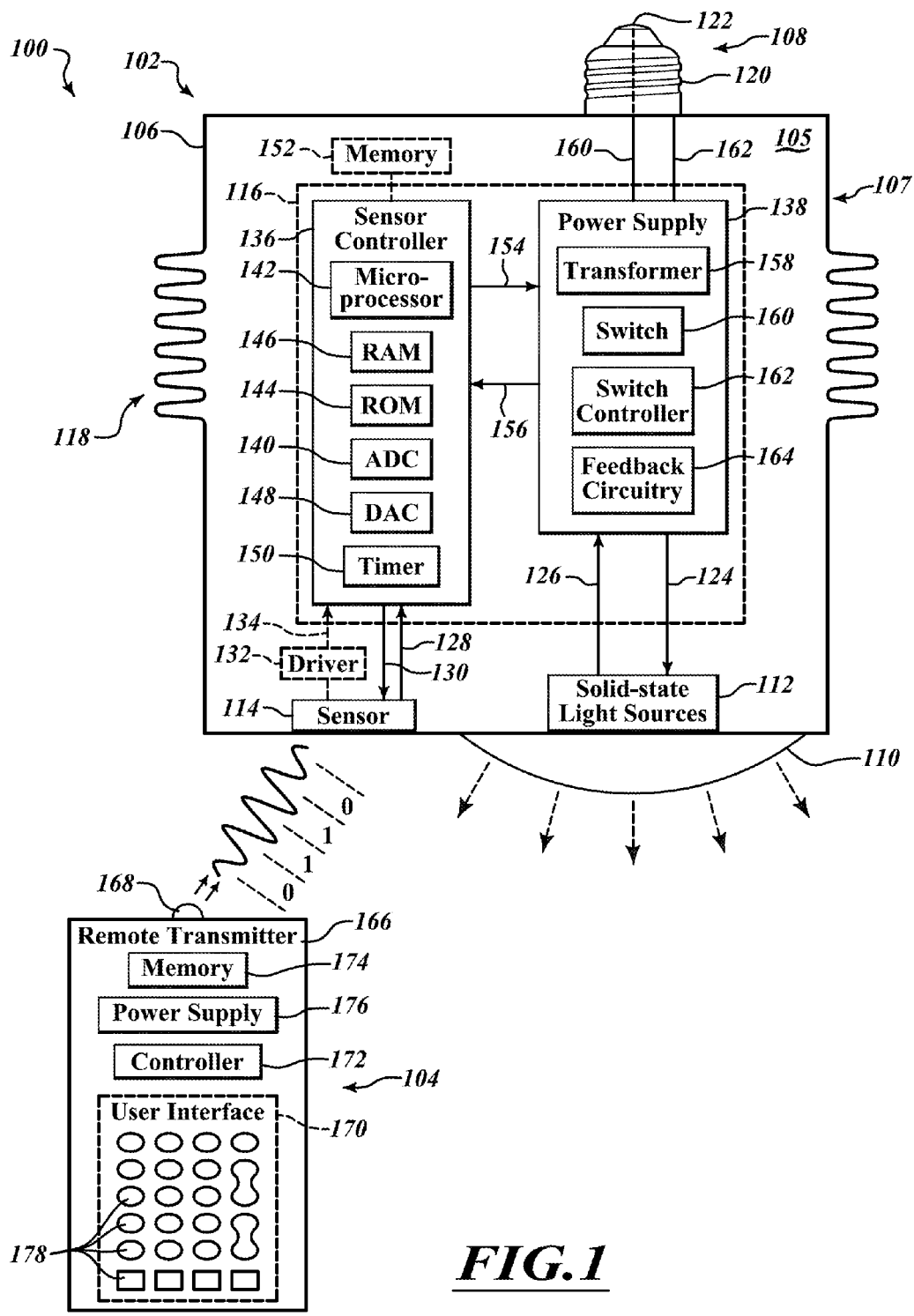
FIG. 1 is a functional block diagram of a lighting system, according to one illustrated embodiment.

FIG. 1 shows a lighting system 100. The lighting system 100 includes a lamp 102 operable to receive a number of line-of-sight wireless signals from a remote transmitter 104.

The lamp 102 may be used with lighting fixtures having a coupler (e.g., receptacle, for instance an Edison threaded female receptacle) configured to provide detachable physical and electrical connections to the lamp 102. The lamp 102 may include a housing 106, a coupler 108, a lens 110, one or more solid-state light sources 112, a sensor 114, and driver electronics 116. The lamp 102 may take the form of a luminaire, providing a complete lighting unit, including light sources, coupler (e.g., male coupler), housing, wiring, and/or optional reflector(s).

The housing 106 may be configured to provide protection to the driver electronics 116 against environmental elements and to provide a structure for transferring heat from an interior 105 of the housing 106 to an exterior ambient environment that surrounds the housing 106 via thermal radiation and/or convection.

The housing 106 may be manufactured or formed from metal, composites, or the like. If formed from metal, housing 106 may be treated with a rust-resilient coating or chemical. The interior 105 of the housing 106 may be hermetically sealed to prevent rain, wind, moisture, and dust from entering the housing 106. The driver electronics 116 may be positioned within the hermetically sealed interior 105 of the housing 106 to prevent or decrease exposure of the driver electronics 116 to environmental elements that may result in corrosion and a shortened life-span of the driver electronics 116.

Alternatively, the housing 106 may include structures which are configured to decrease or regulate the temperature within the housing 106 as well as the temperature of the housing 106. For example, the housing 106 may include a plurality of openings between an outside of the housing 106 and an inside of the housing 106 to enable passive or active heat transfer from the driver electronics 116. The housing 106 may also include fins 118 that protrude from an outer surface 107 of the housing 106. The fins 118 may increase the surface area of the outer surface 107 of the housing 106 to increase the dissipation of heat from the housing 106 through thermal radiation and/or convection.

The housing 106 may physically carry the driver electronics 116 to transfer heat from the driver electronics via conduction. In particular, the housing 106 may include one or more flat surfaces operable to thermally conduct heat away from the driver electronics 116 while the driver electronics 116 are physically and/or thermally conductively coupled to the one or more flat surfaces. Alternatively, the housing 106 may be adaptable to receive a heat sink in the form of a thermally conductive plate or block to which the driver electronics may be physically and/or thermally conductively coupled. Accordingly, the housing 106 may be configured to dissipate heat from the driver electronics 116 through conduction. The housing 106 may sink heat and emit or transfer the heat to the ambient environment surrounding the outer surface 107, most likely via convection and secondarily via radiant heat transfer. The housing 106 may sink heat from the driver electronics 116 via conduction, convection, and/or radiation.

The coupler 108 may be physically attached to the housing 106 to provide a detachable electrical and physical interface to light fixtures. The coupler 108 includes an outer electrode 120 and an inner electrode 122.

The outer electrode 120 may be configured to physically, electrically, detachably, and complementarily couple or mate with receiving couplers of light fixtures. The outer electrode 120 may be manufactured from an electrically conductive material, such as aluminum, tin, copper, or the like. The outer electrode 120 may be formed to include threads, such as may be found on a cap of a traditional light bulb (e.g., Edison screw base). Accordingly, the coupler 108 may be rotatably coupled to complementarily receiving couplers of light fixtures based on the shape of the outer electrode 120.

The outer electrode 120 may be electrically connected to the driver electronics 116 to provide power to the one or more solid-state light sources 112. The outer electrode 120 may be electrically coupled to a complementary electrode of a light fixture to receive power and to supply the received power to the driver electronics 116. Alternatively, the outer electrode 120 may be electrically coupled to a complementary electrode of a light fixture that provides a ground reference. Electrically coupling the outer electrode 122 to the ground reference may provide a return path to the ground reference for current flowing through the driver electronics 116. The outer electrode 120 may also be electrically coupled to the housing 106 to provide a path to the ground reference that reduces build-up of electrical charge on the housing 106.

The inner electrode 122 is electrically insulated from the outer electrode 120 and may be configured to physically, electrically, detachably, and complementarily couple or mate with receiving couplers of light fixtures. The inner electrode 122 may coupled to a complementary electrode in a light fixture to receive power from a light fixture. The inner electrode 122 may be electrically connected to the driver electronics 116 via wires or electrically conductive traces and may transfer power from the light fixture to the driver electronics 116.

The lens 110 is positioned over an opening in the housing 106 and is physically coupled to the housing 106 to at least partially enclose the solid-state light sources 112. The lens 110 may be made from plastic, glass, or the like and is transmissive over at least a portion of the visible light spectrum. The lens 110 may have a nadir surface with a shape that is convex, concave, or approximately flat. Additionally, the lens 110 may include or form a color filter that is operable to adjust the color temperature of light emitted from the solid-state light sources 112. The lens 110 may detachably couple to the housing 106 so that lenses having different shapes and transmission characteristics may be interchangeably coupled to the housing 106.

The solid-state light sources 112 are carried by the housing 106 and are positioned relatively behind the lens with respect to a direction in which light is transmitted by the solid-state light sources 112. The solid-state light sources 112 may include one or more light emitting diodes (LEDs). The LEDs may be one of any of a variety of LEDs, such as phosphor-based LEDs, organic LEDs (OLEDs), or the like. The LEDs may be electrically coupled together in series, in parallel, or in a combination of electrical series and parallel to form a string of LEDs. The solid-state light sources 112 may also receive power from the driver electronics 116 through an electrically conductive path 124 and provide feedback to the driver electronics 116 through an electrically conductive return path 126.

The at least one sensor 114 may be positioned within the housing 106 to receive a number of line-of-sight wireless signals through the lens 110. The at least one sensor 114 may take the form of a photodiode, a CMOS image sensor, or another passive or active photosensitive device. The at least one sensor 114 may transmit output signals to the driver electronics 116 via a communication path 128. The at least one sensor 114 may optionally receive instructions or commands from the driver electronics 116 via a communication path 130. The at least one sensor 114 may be attached to a substrate or backplane that is at least partially enclosed by the lens 110 and the housing 106. The at least one sensor 114 is positioned within the housing 106 so as to be at least partially communicatively line-of-sight accessible through the lens 110. The at least one sensor 114 may be spatially distributed relatively behind the lens 110 to receive the number of line-of-sight wireless signals from a variety of angles of incidence. Alternatively, the at least one sensor 114 may be received or recessed in the housing 106, for example, around a perimeter of the lens 110, or otherwise physically coupled thereto.

The at least one sensor 114 provides a number of wireless sensor output signals that are representative of the sensed line-of-sight wireless signals to the driver electronics 116. The number of line-of-sight wireless signals may be transmitted from the remote transmitter 104 with one of a variety of modulation techniques. For example, the remote transmitter 104 may transmit a number of line-of-sight wireless signals using amplitude modulation, frequency modulation, pulse-code modulation, or the like. The number of line-of-sight wireless signals may also be transmitted in a variety of speeds such as serial infrared (SIR), medium infrared (MIR), fast infrared (FIR), or the like, as defined by the Infrared Data Association (IrDA).

The at least one sensor 114 converts the received number of line-of-sight wireless signals into output signals that are electrical representatives of the wireless signals. The at least one sensor 114 may then transmit the output signals to the driver electronics 116 via the communication path 128. The at least one sensor 114 may convert the optically received wireless signals into voltage and/or current signals having a frequency and amplitude that is proportional to the number of line-of-sight wireless signals. For example, the number of line-of-sight wireless signals may carry or encode a security code comprising a particular sequence of ones and zeros that are amplitude modulated and transmitted by the remote transmitter 104. The at least one sensor 114 may correspondingly convert the amplitude modulated and optically transmitted line-of-sight wireless signals into output signals (e.g., optical, voltage, current, or the like) that are representative of the sequence of ones and zeros that constitute the security code or other data carried by the wireless signals.

A sensor output driver 132 may function as a repeater that optionally receives the output signals from the at least one sensor 114 and transmits the output signals to the driver electronics 116. The output signals from the at least one sensor 114 may represent line-of-sight wireless signals that have been weakly transmitted or transmitted at the cusp of the range of detection of the at least one sensor 114. The sensor output driver 132 may thus amplify the output signals to improve reception of the output signals by the driver electronics 116. Additionally, the at least one sensor 114 may be a plurality of sensors that simultaneously receive or sense the number of line-of-sight wireless signals, and the sensor output driver 132 may sum or mix the combination of output signals from the plurality of sensors 114 prior to transmitting the combination of output signals to the driver electronics 116 for demodulation. In particular, the sensor output driver 132 may transmit the output signals to the driver electronics 116 via a communication path 134.

The driver electronics 116 may be electrically coupled between the coupler 108 and the solid-state light sources 112 to adjust an amount of light output by the solid-state light sources. The driver electronics 116 may adjust the amount of light output by the solid-state light sources based at least in part on the line-of-sight wireless signals sensed by the at least one sensor 114. The driver electronics 116 may include a sensor controller 136 and a power supply 138.

The sensor controller 136 is configured to adjust one or more inputs of the power supply 138 in response to the output signals received from the at least one sensor 114. The sensor controller 136 may include an analog-to-digital converter (ADC) 140, a processor 142, a read-only memory (ROM) 144, a random-access memory 146, and a digital-to-analog converter (DAC) 148. The sensor controller 136 optionally includes one or more timers 150.

The ADC 140 may be coupled to the communication paths 128 and/or 134 to receive the output signals from the at least one sensor 114 and/or the sensor driver 132. The ADC 140 may be allocated one or more input terminals of the sensor controller 136 by which to receive the output signals from the communication paths 128, 134. The ADC 140 converts the output signals to a digital format having one or more bits for use by the processor 142. The ADC 140 may convert the output signals to a single-bit digital sequence based on a frequency of an oscillator.

The processor 142 determines whether instructions or other information is carried by the number of line-of-sight wireless signals, such as an access identifier or light intensity adjustment instructions. The processor 142 may be communicatively coupled to receive the digitized output signals, i.e., sensor data, from the ADC 140. The processor 142 may be configured to temporarily store the sensor data in the RAM 146 in response to instructions stored in the ROM 144. The processor 142 may then determine whether instructions or other information is carried by the sensor data by comparing the stored sensor data to instructions, access identifiers, or the like that are stored in the RAM 146. Alternatively, the processor 142 may store the sensor data in a memory 152 that is external to the sensor controller 136.

The memory 152 may be readable and writable and be communicatively coupled to the sensor controller 136. The memory 152 may be a non-volatile memory such as flash. The memory 152 may be programmed during a manufacture process of the lamp 102 to include manufacturer-established access identifiers and adjustment instructions, as well as default settings for other user-customizable features.

The processor 142 may validate an access identifier carried by the sensor data, such as the pass code or security code. The processor 142 may compare the sensor data against authorization or identification data, such as one or more master access identifiers, stored in the ROM 144, RAM 146, or the memory 152. The master access identifier may be programmed into the ROM 144 or the memory 152 by the manufacturer or may be programmed into the memory 152 by a user. The processor 142 may be configured to ignore any other instructions carried by the sensor data until the access identifier matches data, such as the one or more master access identifiers, stored in at least one of the memories 144, 146, and 152.

The processor 142 may validate light intensity adjustment instructions. In response to validating the access identifier, the processor 142 may cause the sensor controller 136 to enter a command mode. In the command mode, the sensor controller 136 may become responsive to adjustment instructions to vary the light intensity of the solid-state light sources 112. Specifically, in the command mode the processor 142 may compare the sensor data to adjustment instructions stored in the ROM 144. Validation occurs when the processor 142 determines that sensor data matches an adjustment instruction, after which the processor 142 communicates the adjustment instruction to the power supply 138. Additionally, the processor 142 may be configured to ignore adjustment instructions carried by the sensor data until the command mode has been entered.

The sensor controller 136 may stay in the command mode for a duration determined by the timer 150. In response to entering the command mode, the processor 142 may execute the timer 150 and exit the command mode at the expiration of the timer 150. The processor 142 may additionally reinitiate the timer 150 upon receipt of each validated light intensity adjustment instruction. In this way, a user may continue to increase and decrease the light intensity of the solid-state light sources 112 without having to retransmit the access identifier.

The processor 142 may communicate adjustment instructions from the sensor controller 136 to the power supply 138 in several ways. The sensor controller 136 may be communicatively coupled to the power supply 138 via a communication path 154. The processor 142 may transmit or adjust an analog voltage on the communication path 154, for example by altering an output of the DAC 148. The processor 142 may cause the DAC 148 to output an increased or decreased voltage to the communication path 154 in response to adjustment instructions to increase the light intensity or decrease the light intensity, respectively. Alternatively, the processor 142 may transmit light intensity adjustment instructions to the power supply 138 via the communication path 154 in the form of one or more digital bytes. The sensor controller 136 may receive acknowledgment from the power supply 138 via a connection 156 in response to the communicated adjustment instructions. Alternatively, the sensor controller 136 may use the connection 156 to receive power from the power supply 138.

Accordingly, the driver electronics 116 are responsive to adjustment instructions to vary the amount of light output by the solid-state light sources 112.

When the lamp 102 is initially powered ON, the processor 142 may retrieve an initial light intensity setting for the solid-state light sources 112. The processor 142 may retrieve the setting from the memory 152. The processor may then cause the DAC 148 to output a level of voltage corresponding to the light intensity setting onto the communication path 154 to set the output intensity of the solid-state light sources 112. When the lamp 102 receives a valid instruction to adjust the light intensity for the solid-state light sources 112, the processor 142 may store a setting corresponding to the new light intensity in the memory 152. The new light intensity setting stored in the memory 152 may then be used the next time the lamp 102 is switched OFF and ON again.

The power supply 138 is electrically coupled between the coupler 108, the solid-state light sources 112, and the sensor controller 136 to selectively vary the output intensity of the solid-state light sources 112. The power supply 138 may vary the output intensity of the solid-state light sources 112 by varying the duty cycle of the power signal to the solid-state light sources 112, by selectively choosing between different numbers of solid-state light sources 112 (e.g., 15 LEDs at one time and 30 LEDs at another), or by varying the magnitude of current and/or voltage to the solid-state light sources 112. The power supply 138 may receive power from the coupler 108 via a voltage reference line 155 and a ground reference line 157. The power supply 138 may include a transformer 158, a switch 160, a switch controller 162, and feedback circuitry 164.

The transformer 158 may be electrically coupled to receive power from the voltage reference line 155 and the ground reference line 157. The transformer 158 may be configured to increase or decrease the voltage received from the voltage reference line 155. The transformer 158 may be electrically coupled to conductive path 124 to provide power to the solid-state light sources 112. The transformer 158 may provide more or less power to the solid-state light sources 112 based upon the duration and/or frequency with which current is permitted to flow through at least one winding of the transformer 158.

The switch 160 may be electrically coupled between the ground reference line 157 and the transformer 158 to selectively conduct current through the at least one winding of the transformer 158. The switch 160 may be a metal oxide semiconductor field effect transistor (MOSFET), an insulated gate bipolar transistor (IGBT), or the like. The switch 160 may include a control terminal that is electrically coupled to be operated from the switch controller 162.

The switch controller 162 may be configured to control the duration and frequency with which current flows through the at least one winding of the transformer 158 by selectively operating the switch 160. The switch controller 162 may operate the switch 160 by transmitting a series of pulses to the control terminal of the switch 160. The switch controller 162 may vary the amplitude, duty cycle, and/or frequency of the series of pulses in response to the input received from the sensor controller 136.

The switch controller 162 may have an input that is electrically coupled to the communication path 154. The switch controller 162 may sense a voltage level on the communication path 154. The switch controller 162 may increase the power output to the solid-state light sources 112 and decrease the power output to the solid-state light sources 112 in response to respective increases and decreases in the level of voltage on the communication path 154. Specifically, the switch controller 162 may increase or decrease the duty cycle and/or frequency of the series of pulses transmitted to the switch 160 to increase or decrease, respectively, the power output by the transformer 158.

The feedback circuitry 164 may provide information to the switch controller 162 that is indicative of an amount of power being supplied to the solid-state light sources 112. The feedback circuitry 164 may be electrically coupled to the conductive return path 126 to monitor the current flowing through the solid-state light sources 112. The feedback circuitry 164 may be electrically coupled to the communication path 154 and may be responsive to the level of voltage on the communication path 154. In other words, the feedback circuitry 164 may increase or decrease the light intensity of the solid-state light sources 112 by adjusting the feedback provided to the switch controller 162 based on the level of voltage on the communication path 154.

The remote transmitter 104 transmits the number of line-of-sight wireless signals to the lamp 102 to adjust the output intensity of the solid-state light sources 112. The remote transmitter 104 may include a remote transmitter housing 166, an optical transmission device 168, a user interface 170, a remote transmitter controller 172, a memory 174, and a power supply 176.

The optical transmission device 168 transmits the number of line-of-sight wireless signals in response to commands from the remote transmitter 104. Optical transmission device 168 may be operable to transmit the wireless signals in any one of a variety of formats, such as amplitude modulation, frequency modulation, or pulse code modulation. The optical transmission device 168 may be a photodiode carried by the remote transmitter housing 166 and configured to transmit light within the infrared frequency band. The optical transmission device 168 transmits the wireless signals based upon inputs provided to the user interface 170.

The user interface 170 may take one of a variety of forms. For example, the user interface 170 may include a plurality of buttons or keys 178. The user interface 170 may enable a user to enter a series of numbers representing the access identifier, for example, 3-1-5-5-5-2. As discussed above, the access identifier may be programmed into a memory 144, 152 in the lamp 102 by the manufacturer and may be reprogrammed to a desired value by the user. Alternatively, the user interface 170 may be a touchscreen interface, such as a resistive touchscreen, a passive touchscreen, or an acoustic touchscreen with a graphical user interface including one or more user selectable icons. As another alternative, the user interface 170 may include a microphone and be configured to receive audio commands from the user.

The remote transmitter controller 172 may be electrically coupled between the user interface 170 and the optical transmission device 168. The remote transmitter controller 172 translates commands that are manually or vocally entered via the user interface 170 into digital signals for optical transmission. The controller 172 may translate commands entered into the user interface 170 in response to an instruction set stored in the memory 174.

The memory 174 may be a volatile or nonvolatile memory. The memory 174 may store instructions for running the controller 172. Additionally, the memory 174 may store shortcuts or defined settings or other user preferences programmed by a user through the user interface 170.

The power supply 176 may supply current voltage to remote transmitter 104. The power supply 176 may be electrically connected to optical transmission device 168, the controller 172, and the memory 174. The power supply 176 may be a replaceable battery. The battery may be a lithium-ion battery, a nickel metal hydride battery, or the like. Alternatively, or additionally the power supply may include a photovoltaic cell that provides charge to a charge storage device, such as a capacitor.

In operation, the lighting system 100 may be operated in the following hypothetical manner. A user may walk onto a floor of a store which has installed one or more lamps 102 overhead. The user may determine that the output intensity of one or more of the lamps 102 is too bright. The user may point the remote transmitter 104 in the direction of the sensor 114 from beneath a selected lamp 102 and enter the access identifier, such as 3-1-5-5-5-2. In response to validation of the access identifier, that sensor controller 136 of the driver electronics 116 may enter a command mode. The user may then press a button or key (e.g., labeled "+") of the user interface 170. The remote transmitter 104 may transmit a number of line-of-sight wireless signals corresponding to increasing the light output intensity. The sensor controller 136 may receive the command from the sensor 114 and increase a level of voltage on the communication path 154. In response to the increase in the level of voltage on the communication path 154, the power supply 138 may change the number of solid-state light sources 112 activated, may change the duty cycle of the power supplied to the solid-state light sources 112, or may increase the voltage and/or current supplied through the conductive path 124 to the solid-state light sources 112. As a result, the solid-state light sources 112 may emit an increased amount of light. After a predetermined amount of time, (e.g., 5 seconds) the sensor controller 136 may exit command mode, causing the lamp 102 to ignore subsequently received commands from the remote transmitter 104 until the access identifier is again validated.

Figure 2:
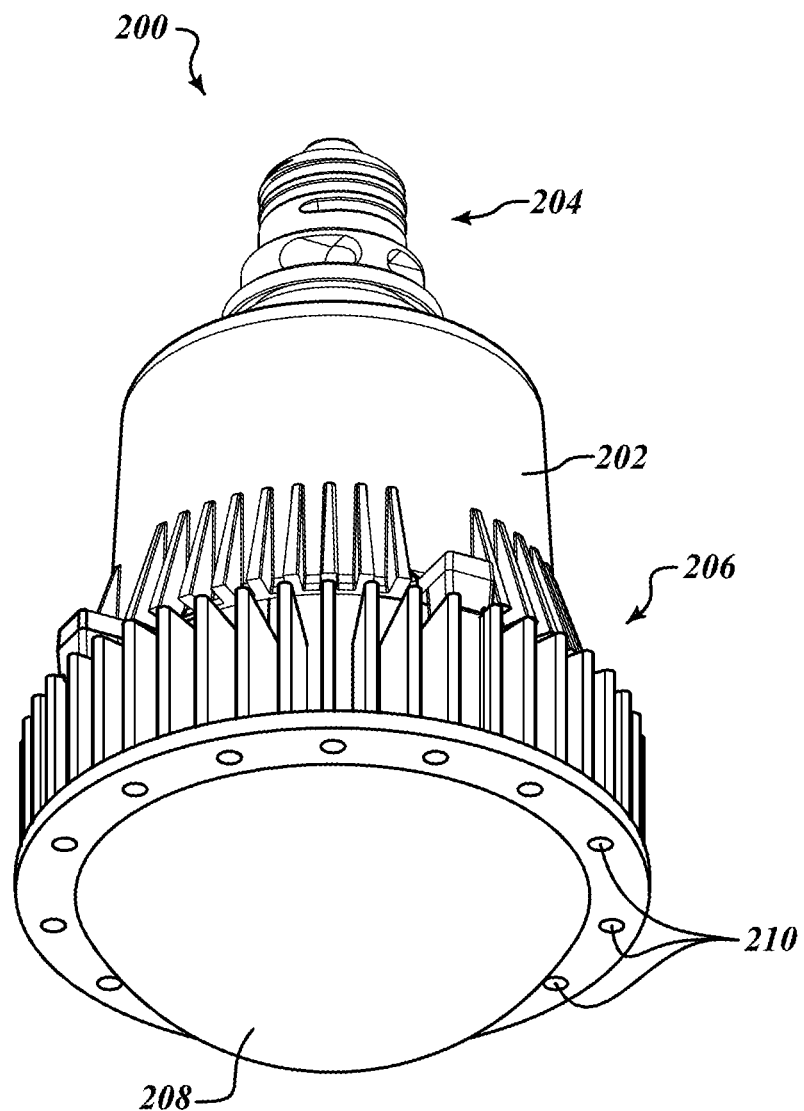
FIG. 2 is an isometric view of a lamp, according to one illustrated embodiment.

FIG. 2 illustrates a lamp 200 that may be an implementation of the lamp 102 of the lighting system 100. The lamp 200 may include a housing 202, a physical and electrical coupler 204, a plurality of fins 206, a lens 208 and a plurality of photosensitive sensors 210. As illustrated, the plurality of photosensitive sensors 210 may be received by the housing 202 to surround a perimeter of the lens 208.

Figure 3:
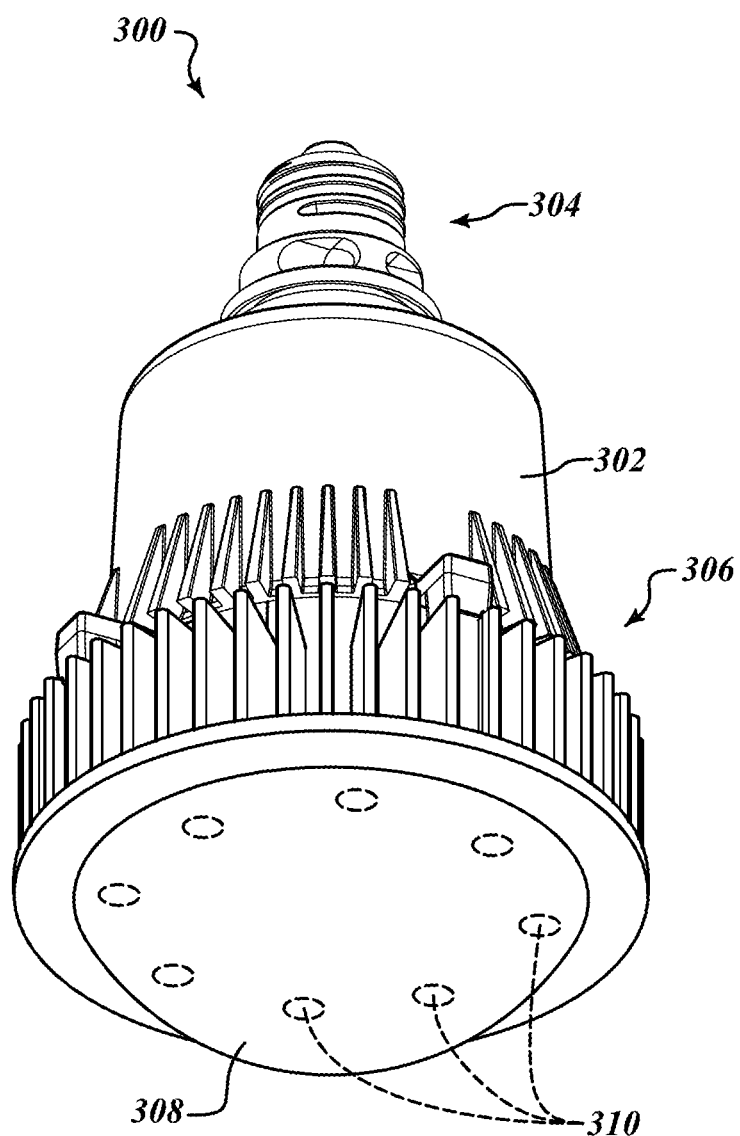
FIG. 3 is an isometric view of a lamp, according to another illustrated embodiment.

FIG. 3 illustrates a lamp 300 that may be an implementation of the lamp 102 of the lighting system 100. The lamp 300 may include a housing 302, an electrical and physical coupler 304, a plurality of fins 306, a lens 308, and a plurality of photosensitive sensors 310. As illustrated, the plurality of photosensitive sensors 310 may be positioned relatively behind the lens 308 and may be enclosed by the housing 302 and the lens 308.

The specific values, such as voltages, used herein are purely illustrative, and are not meant to be in anyway limiting on the scope. Likewise, the arrangements and topologies are merely illustrative and other arrangements and topologies may be employed where consistent with the teachings herein. While specific circuit structures are disclosed, other arrangements that achieve similar functionality may be employed.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act through the use of appropriate circuitry. For example, compensation and level shifting may be combined.

To the extent that they are not inconsistent with the teachings herein, the teachings of: U.S. provisional patent application Ser. No. 61/052,924 filed May 13, 2008; U.S. patent application Ser. No. 12/437,467 filed May 7, 2009 and published as U.S. patent application Publication No. 2009-0284155; U.S. provisional patent application Ser. No.

61/051,619 filed May 8, 2008; U.S. patent application Ser. No. 12/437,472 filed May 7, 2009 and published as U.S. patent application Publication No. 2009-0278474; U.S. provisional patent application Ser. No. 61/088,651 filed Aug. 13, 2008; U.S. patent application Ser. No. 12/540,250 filed Aug. 12, 2009 and published as U.S. patent application Publication No. 2010-0090577; U.S. provisional patent application Ser. No. 61/115,438 filed Nov. 17, 2008; U.S. provisional patent application Ser. No. 61/154,619 filed Feb. 23, 2009; U.S. patent application Ser. No. 12/619,535 filed Nov. 16, 2008 and published as U.S. patent application Publication No. 2010-0123403; U.S. provisional patent application Ser. No. 61/174,913 filed May 1, 2009(.406P1); U.S. patent application Ser. No. 12/769,956 filed Apr. 29, 2010 and published as U.S. patent application Publication No. 2010-0277082; U.S. provisional patent application Ser. No. 61/180,017 filed May 20, 2009, U.S. patent application Ser. No. 12/784,080 filed May 2010 and published as U.S. patent application Publication No. 2010-0295946; U.S. provisional patent application Ser. No. 61/229,435 filed Jul. 29, 2009; U.S. patent application Ser. No. 12/846,516 filed Jul. 29, 2010 and published as U.S. patent application Publication No. 2011-0026264; U.S. provisional patent application Ser. No. 61/295,519 filed Jan. 15, 2010; U.S. provisional patent application Ser. No. 61/406,490 filed Oct. 25, 2010; U.S. patent application Ser. No. 13/007,080 filed Jan. 14, 2011; U.S. provisional patent application Ser. No. 61/333,983 filed May 12, 2010; U.S. patent application Ser. No. 12/784,091 filed May 20, 2010 and published as U.S. patent application Publication No. 2011-0295454; U.S. provisional patent application Ser. No. 61/346,263 filed May 19, 2010; U.S. patent application Ser. No. 12/784,093 filed May 20, 2010; U.S. patent application Ser. No. 13/166,626 filed Jun. 22, 2011; U.S. patent application Ser. No. 13/085,301 filed Apr. 12, 2011; U.S. patent application Ser. No. 13/212,074 filed Aug. 17, 2011; and U.S. provisional patent application Ser. No. 61/534,722 filed Sep. 14, 2011 are each incorporated herein by reference in their entirety.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lighting system for use with lighting fixtures having at least one coupler configured to provide detachable physical and electrical connections therewith, the lighting system comprising:
a lamp, including:
a number of solid-state light sources;
at least one complementary coupler that physically and electrically detachably couples to the coupler of the lighting fixture;
at least one sensor responsive to a number of line-of-sight wireless signals to provide a number of wireless sensor output signals representative of the sensed line-of-sight wireless signals; and
a set of driver electronics electrically coupled between the complementary coupler of the lamp and the solid-state light sources of the lamp;
wherein the driver electronics includes a controller that validates an access identifier encoded in the received number of line-of-sight wireless signals; and
wherein, responsive to a successful validation of the access identifier, the controller executes a timer that defines a time period during which the controller is placed in a command mode in which the controller accepts adjustment instructions encoded in the received number of line-of-sight wireless signals.

2. The lighting system of claim 1, further comprising:
a remote transmitter having a user interface selectively operable by a user to receive a number of user inputs, the remote transmitter operable to transmit the number of line-of-sight wireless signals in response to the user inputs received via the user interface.

3. The lighting system of claim 2 wherein the line-of-sight wireless signals include adjustment instructions indicative of an adjustment in the amount of light output by the solid-state light sources, and the driver electronics are responsive to the adjustment instructions to vary the amount of light output by the solid-state light sources based on the adjustment instructions.

4. The lighting system of claim 1, further comprising: a memory communicatively coupled to the controller, wherein the controller validates the access identifier against data stored in the memory.

5. The lighting system of claim 4 wherein the memory is writable and data stored therein is user-changeable.

6. The lighting system of claim 1 wherein in response to a validation of the access identifier by the controller, the controller enters a command mode within which the controller is responsive to a number of additional adjustment instructions to vary the output intensity of the solid-state light sources.

7. The lighting system of claim 1 wherein the controller exits the command mode at an expiration of the timer.

8. The lighting system of claim 1 wherein in response to the validation of the access identifier the controller executes a timer, reinitiates the timer on receipt of each additional adjustment instruction, and exits the command mode at an expiration of the timer.

9. The lighting system of claim 1 wherein the driver electronics includes a transformer having a primary and a secondary, the primary electrically coupled to the complementary coupler, and a switch mode power converter electrically coupled to the secondary of the transformer and to the solid-state light sources.

10. The lighting system of claim 1 wherein the lamp takes the form of a luminaire and further includes:
a housing physically coupled to the complementary coupler and that at least partially encloses the driver electronics.

11. The lighting system of claim 10 wherein the at least one sensor includes a plurality of sensors recessed into the housing.

12. The lighting system of claim 1 wherein the lamp takes the form of a luminaire and further includes a lens and the solid-state light sources and the at least one sensor are positioned relatively behind the lens with respect to a direction in which light is transmitted by the solid-state light sources.

13. A method of manufacturing a lamp for use with lighting fixtures having at least one coupler configured to provide detachable physical and electrical connections therewith, the method comprising:

electrically coupling a complementary coupler of the lamp, that physically and electrically detachably couples to the at least one coupler of the lighting fixture, to a number of solid-state light sources;

communicatively coupling a set of driver electronics to at least one sensor that is responsive to a number of line-of-sight wireless signals and that provides a number of wireless sensor output signals representative of the sensed line-of-sight wireless signals;

electrically coupling the set of driver electronics between the complementary coupler of the lamp and the solid-state light sources of the lamp to adjust an amount of light output by the solid-state light sources based at least in part on the line-of-sight wireless signals sensed by the at least one sensor;

validating, by a controller included in the driver electronics, an access identifier encoded in the line-of-sight wireless signals; and responsive to a successful validation of the access identifier by the controller, executing, by the controller, a timer that defines a time period during which the controller is placed in a command mode in which the controller accepts adjustment instructions encoded in the received number of line-of-sight wireless signals.

14. The method of claim 13, further comprising:

physically coupling a housing to the complementary coupler of the lamp; and mounting the at least one sensor to the housing.

15. The method of claim 13, further comprising:

positioning the at least one sensor and the solid-state light sources relatively behind a lens with respect to a direction in which light is transmitted from the solid-state light sources.

16. The method of claim 13, further comprising:

configuring the set of driver electronics to validate an access identifier encoded in the number of line-of-sight wireless signals; and after the set of driver electronics validates the access identifier, configuring the set of driver electronics to adjust the amount of light output by the solid-state light sources in response to output intensity adjustment instructions encoded in the number of line-of-sight wireless signals.

17. The method of claim 15, further comprising:

communicatively coupling a rewriteable memory to the set of driver electronics; and storing a user-changeable master access identifier in the rewriteable memory against which the set of driver electronics validates the encoded access identifier.

18. The method of claim 17, further comprising:

electronically storing a set of adjustment instructions in the lamp that are indicative of output intensity adjustment instructions encodable in the number of line-of-sight wireless signals; and configuring the set of driver electronics to adjust the amount of light output by the solid-state light sources in response to comparing the set of adjustment instructions to the output intensity adjustment instructions encoded in the number of line-of-sight wireless signals.

19. A method of operating a solid-state lamp for use with lighting fixtures having at least one coupler configured to provide detachable physical and electrical connections therewith, comprising:

physically and electrically coupling a complementary coupler of the solid-state lamp to the at least one coupler of the fixture to transfer power to the solid-state lamp;

receiving a number of wireless line-of-sight signals with a sensor that is electrically coupled to the solid-state lamp and that is carried by the solid-state lamp;

validating, by a controller included in the driver electronics, an access identifier encoded in the received number of line-of-sight wireless signals; and responsive to the successful validation of the received access identifier, executing a timer that defines a time period during which the controller is placed in a command mode in which the controller accepts output intensity adjustment commands encoded in the received number of line-of-sight wireless signals; and adjusting, with a set of driver electronics that are carried by the lamp, an amount of light output by the solid-state lamp in response to the output intensity adjustment commands encoded in the number of wireless line-of-sight signals.

20. The method of claim 19, further comprising:

entering a command mode in response to validating, with the set of driver electronics, an access identifier embedded in the wireless line-of-sight signals;

receiving an additional number of wireless line-of-sight signals during a pendency of the timer; and preventing an adjustment, that is based on the additional number of wireless line-of-sight signals, of the amount of light output by the solid-state lamp while not in the command mode.

21. The method of claim 19, further comprising:

communicatively coupling a memory that is carried by the solid-state lamp to the set of driver electronics;

storing a digital potentiometer setting in the memory;

determining a resistance between at least two terminals of the digital potentiometer based upon the stored potentiometer setting; and setting the amount of light output by the solid-state lamp based upon the resistance between the at least two terminals of the digital potentiometer.

* * * * *